(12) United States Patent
Nekado et al.

(10) Patent No.: US 6,360,047 B1
(45) Date of Patent: Mar. 19, 2002

(54) OPTICAL WAVEGUIDE CIRCUIT AND METHOD OF FABRICATING SAME

(75) Inventors: Yoshinobu Nekado; Shirou Nakamura, both of Ichihara (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/469,106

(22) Filed: Dec. 21, 1999

(30) Foreign Application Priority Data

Dec. 25, 1998 (JP) .............................. 10-369595
Dec. 6, 1999 (JP) .............................. 11-346209

(51) Int. Cl.[7] .................................................. G02B 6/10
(52) U.S. Cl. .................. 385/129; 385/14; 385/130; 385/131; 385/132; 385/39; 385/42
(58) Field of Search .......................... 385/14, 129, 130, 385/131, 132, 42, 40, 39, 45

(56) References Cited

U.S. PATENT DOCUMENTS

| | | | | |
|---|---|---|---|---|
| 5,151,959 A | * | 9/1992 | Mueller et al. | ................ 385/50 |
| 5,206,925 A | * | 4/1993 | Nakazawa et al. | .......... 385/142 |
| 5,303,319 A | * | 4/1994 | Ford et al. | .................. 385/131 |
| 6,009,218 A | * | 12/1999 | Grand et al. | .................. 385/14 |
| 6,157,765 A | * | 12/2000 | Bruce et al. | ................ 385/129 |

\* cited by examiner

*Primary Examiner*—Brian Healy
(74) *Attorney, Agent, or Firm*—Frishauf, Holtz, Goodman, Langer & Chick, P.C.

(57) ABSTRACT

An optical waveguide circuit having a waveguide core of a desired shape formed on a substrate and method of fabricating same. The optical waveguide circuit is manufactured in a manner such that light confinement portions having substantially the same refractive index as the waveguide core are arranged along one or both sides of the waveguide core. The waveguide core and the light confinement portions are formed simultaneously.

13 Claims, 6 Drawing Sheets

OPTICAL WAVEGUIDE CIRCUIT AND METHOD OF FABRICATING SAME

BACKGROUND OF THE INVENTION

1. Field of the Invention

The present invention relates to an optical waveguide circuit and method of fabricating same.

2. Description of the Prior Art

In the field of modern optical communication, wavelength division multiplexing (WDM) communication has been extensively investigated and developed as means for drastically increasing the transmission capacity. Realization of the WDM communication requires development of an optical waveguide circuit that enjoys high wavelength branching performance or a high isolation characteristic.

Figure 10:
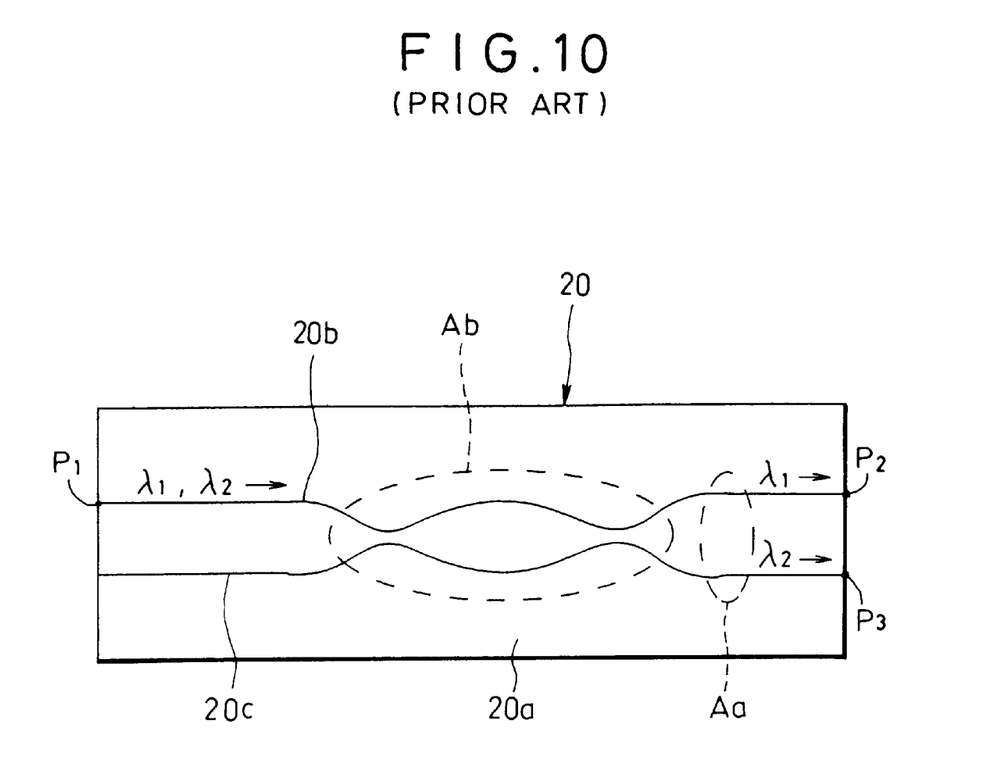
FIG. 10 is a plan view showing a conventional optical waveguide circuit.

FIG. 10 shows an example of an existing optical waveguide circuit. An optical waveguide circuit 20 shown in FIG. 10 is a wavelength multiplexing-branching filter of the Mach-Zehnder type, in which waveguide covres 20b and 20c, including a core and a clad, are formed on a substrate 20a. In the optical waveguide circuit 20, a light beam with wavelengths λ1 and λ2 that is projected from an optical waveguide, such as an optical fiber, onto a port P1 of the waveguide core 20b is branched into light beams with wavelengths λ1 and λ2 in an optical multiplexing-branching region Ab. The branch beams are guided individually to ports P2 and P3 of the waveguide cores 20b and 20c, and are emitted toward other optical waveguides such as optical fibers that are connected optically to the ports P2 and P3.

In the optical waveguide circuit 20, light incident upon the clad, not upon the core, at the port P1 of the waveguide core 20b and a radiation mode of the light generated in the optical waveguide circuit 20 propagate in the clad as a clad mode. Thus, in a general region Aa behind the optical multiplexing-branching region Ab, the clad-mode light lands on the waveguide cores 20b and 20c and leaks into the ports P2 and P3.

If the clad-mode light is generated in the optical waveguide circuit 20, therefore, the isolation characteristic is lowered to cause cross talks and other adverse effects on the quality of optical communication.

SUMMARY OF THE INVENTION

The object of the present invention is to provide an optical waveguide circuit, capable of restraining clad-mode light from landing on a waveguide core or from leaking into other ports, and method of fabricating same.

In order to achieve the above object, according to the present invention, there is provided an optical waveguide circuit having a waveguide core of a desired shape formed on a substrate. In this optical waveguide circuit, light confinement portions having substantially the same refractive index as the waveguide core are arranged along one or both sides of the waveguide core.

In the present specification, the phrase "light confinement portions having substantially the same refractive index as the waveguide core" implies that the respective refractive indexes of the light confinement portions and the waveguide core are equal or approximate to each other. Thus, based on the difference in specific refractive index between a core and a clad that constitutes the waveguide core, the width of each light confinement portion is adjusted to a value such that a maximum light confinement effect can be obtained. For example, the width of each light confinement portion is set at about 1 μm or more, preferably at 3 to 20 μm, and most preferably at 5 to 9 μm.

The waveguide core and the light confinement portion are arranged at a distance of 30 μm or more from each other.

Further, the waveguide core has a branching portion at which an optical filter is located across the waveguide core.

In order to achieve the above object, according to the present invention, there is provided a manufacturing method for the optical waveguide circuit having a waveguide core of a desired shape on a substrate and light confinement portions arranged along one or both sides of the waveguide core. In this manufacturing method, the waveguide core and the light confinement portions are formed simultaneously.

According to the present invention, there may be provided an optical waveguide circuit and method of fabricating same, whereby clad-mode light can be restrained from landing on the waveguide core or from leaking into other ports. According to the method of the invention, moreover, the waveguide core and the light confinement portions are formed simultaneously, so that the optical waveguide circuit can be manufactured in simple processes at low cost.

The above and other objects, features, and advantages of the invention will be more apparent from the ensuing detailed description taken in connection with the accompanying drawings.

DETAILED DESCRIPTION OF THE PREFERRED EMBODIMENTS

The embodiments of an optical waveguide circuit according to the present invention and method of fabricating same will now be described in detail with reference to the accompanying drawings of FIGS. 1 to 9.

Figure 1:
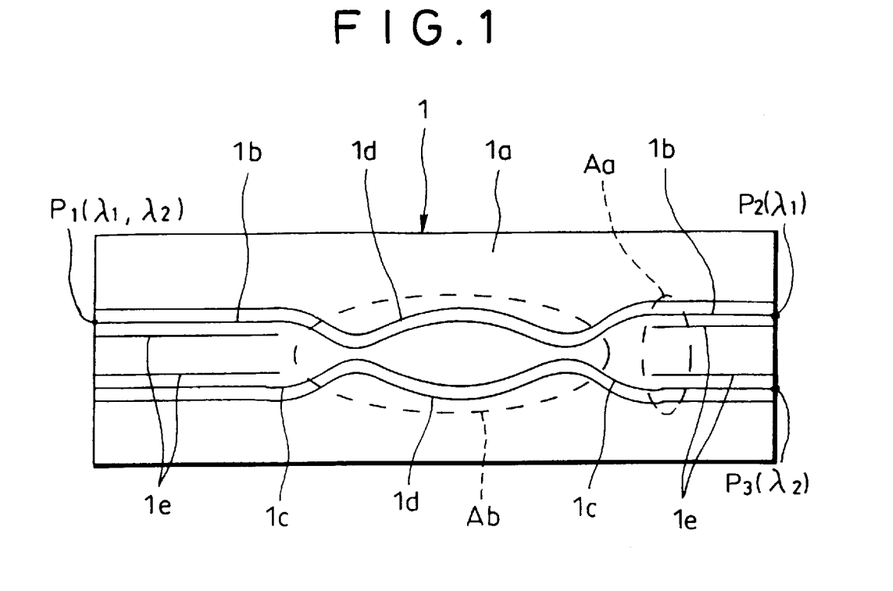
FIG. 1 is a plan view showing a first embodiment of an optical waveguide circuit manufactured by a manufacturing method according to the present invention.

An optical waveguide circuit 1 is based on a first embodiment, an improvement of a conventional optical waveguide circuit having a Mach-Zehnder structure. As shown in FIG. 1, waveguide cores 1b and 1c, including a core and a clad, are formed on a substrate 1a that is formed of a compound semiconductor material, such as silicon (Si) or gallium arsenide (GaAs), or some other material such as silica glass, sapphire, etc. Further, light confinement portions 1d and 1e, which have substantially the same refractive index as the waveguide cores 1b and 1c, are arranged along the opposite sides of each waveguide core 1b and 1c.

In the description to follow, regions indicated by broken lines Ab and Aa corresponding to the waveguide cores 1b and 1c of the optical waveguide circuit 1 shown in FIG. 1 will be referred to as an optical multiplexing-branching region Ab and a general region Aa, respectively.

The light confinement portions 1d and 1e are formed in order to reduce cross talks that are generated in the optical waveguide circuit 1. As shown in FIG. 1, the light confinement portions 1d extend along the outside of the waveguide cores 1b and 1c, covering the overall length of the substrate 1a. The light confinement portions 1e are formed individually on the longitudinally opposite end sides of the substrate 1a so as to extend along the inside of the waveguide cores 1b and 1c.

The optical waveguide circuit 1 with this construction is manufactured by the following method. For example, fine particles of $SiO_2$-based glass that is loaded with phosphorus, boron, etc. are deposited on the substrate by a flame hydrolysis reaction in the FHD (flame hydrolysis deposition) method using an oxygen-hydrogen flame burner, and the deposited glass particles are converted into transparent glass by a high-temperature heat treatment.

Figure 3A:
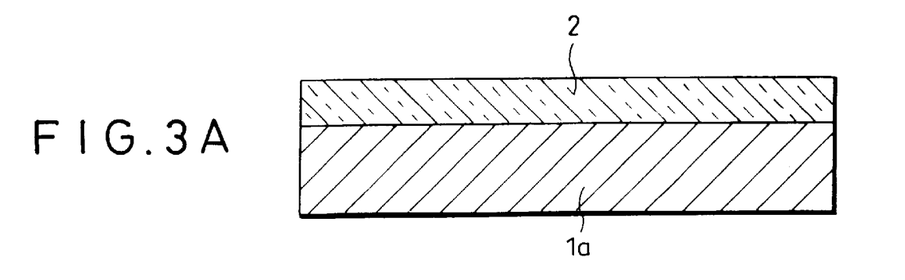
FIGS. 3A to 3D are manufacturing process diagrams for illustrating the manufacturing method for the optical waveguide circuit of FIG. 1.

First, a lower clad layer 2 of a quartz-based glass material was formed on the substrate 1a by the FHD method, as shown in FIG. 3A.

Figure 3B:
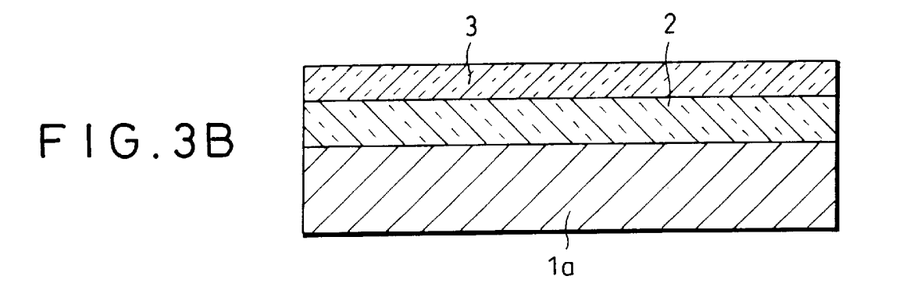

Thereafter, a core film 3 of a quartz-based glass material was formed by the FHD method, as shown in FIG. 3B. The core film 3 has a refractive index higher than that of the lower clad layer 2 and an upper clad layer 4 which will be mentioned later.

Figure 3C:
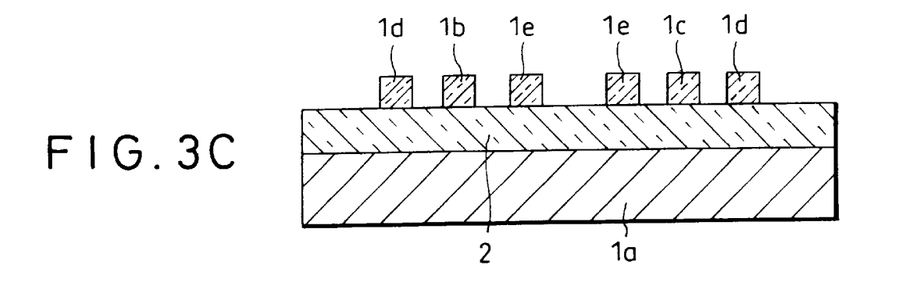

Then, the core film 3 was etched by the RIE (reactive ion etching) method, whereupon the waveguide cores 1b and 1c and the light confinement portions 1d and 1e were formed simultaneously, as shown in FIG. 3C.

Figure 3D:
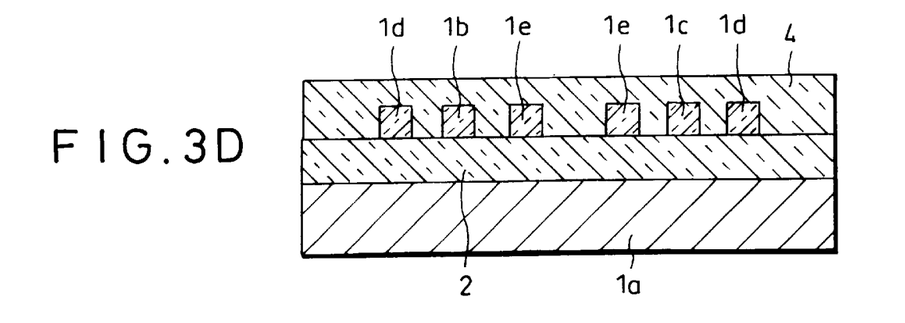

Subsequently, the upper clad layer 4 of the quartz-based glass material was formed on the resulting structure by the FHD method, whereupon the optical waveguide circuit 1 was completed, as shown in FIG. 3D. The manufacturing method is not limited to the FHD method, and may alternatively be sputtering, vacuum evaporation, or CVD (chemical vapor deposition). Further, the lower clad layer 2, core film 3, and upper clad layer 4 may alternatively be formed of an organic material such as polyimide.

Since the refractive index of the light confinement portions 1d and 1e is higher than that of the lower and upper clad layers 2 and 4, light is confined to the portions 1d and 1e. Thus, the light cannot leak out from these portions into the lower or upper clad layer 2 or 4. The light confinement portions 1d and 1e according to the present embodiment, in particular, are made of the same material as the waveguide cores 1b and 1c, since they are formed simultaneously with the cores 1b and 1c by the RIE method.

Figure 2:
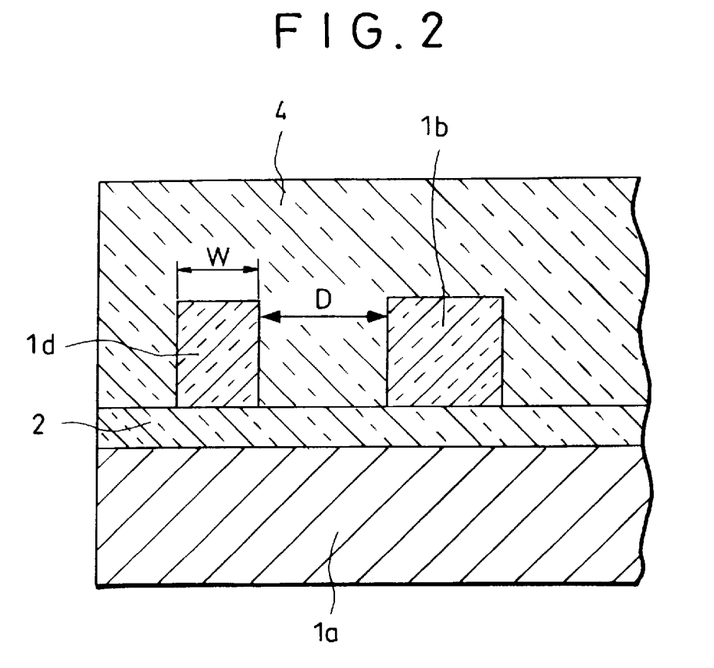
FIG. 2 is a sectional view for illustrating the distance between a waveguide core and a light confinement portion of the optical waveguide circuit of FIG. 1.

A distance D between the waveguide core 1b and its corresponding light confinement portion 1d shown in FIG. 2, among the distances between the waveguide cores 1b and 1c and the light confinement portions 1d and 1e, is adjusted to an interval (=distance D) of about 30 to 70 μm or more such that no direct optical coupling occurs between the core 1b and the portion 1d.

In the general region Aa that is situated close to the optical multiplexing-branching region Ab shown in FIG. 1, as mentioned before, moreover, the light confinement portions 1d and 1e are located so that the distances between the waveguide cores 1b and 1c and the light confinement portions 1d and 1e are adjusted to the interval (=distance D) of about 30 to 70 μm or more lest there be direct optical coupling between the waveguide cores 1b and 1c and the light confinement portions 1d and 1e. In this case, the light confinement portions 1e are located even in the optical multiplexing-branching region Ab as long as the interval causes no direct optical coupling between them and the waveguide cores 1b and 1c.

On the other hand, a width W (see FIG. 2) of each light confinement portion 1d must be adjusted to a value such that the a maximum light confinement effect can be obtained, and is set at about 1 μm or more, preferably at 3 to 20 μm, and most preferably at 5 to 9 μm.

When a light beam with wavelengths λ1 and λ2 is projected from an optical waveguide, such as an optical fiber, onto a port P1 of the waveguide core 1b, in the optical waveguide circuit 1 constructed in this manner, it is branched into light beams with wavelengths λ1 and λ2 in the optical multiplexing-branching region Ab. The branch beams are guided individually to ports P2 and P3 of the waveguide cores 1b and 1c, and are emitted toward other optical waveguides such as optical fibers that are connected optically to the ports P2 and P3.

In the optical waveguide circuit 1, light incident upon the clad layers 2 and 4, not upon the waveguide core 1b, at the port P1 and a radiation mode of the light generated in the optical waveguide circuit 1 (at a waveguide offset (mode scrambler), directional coupler portion, wavelength bent portion, etc.) propagate as leakage light beams in a clad mode.

In the optical waveguide circuit 1, however, the leakage light beams in the clad mode get into and are confined to the light confinement portions 1d and 1e that are arranged individually along the opposite sides of the waveguide cores 1b and 1c. In the optical waveguide circuit 1, therefore, the leakage light beams can be restrained from landing on the waveguide cores 1b and 1c in the general region Aa behind the optical multiplexing-branching region Ab or from leaking directly into the ports P2 and P3, so that a high isolation characteristic can be obtained.

Figure 4:
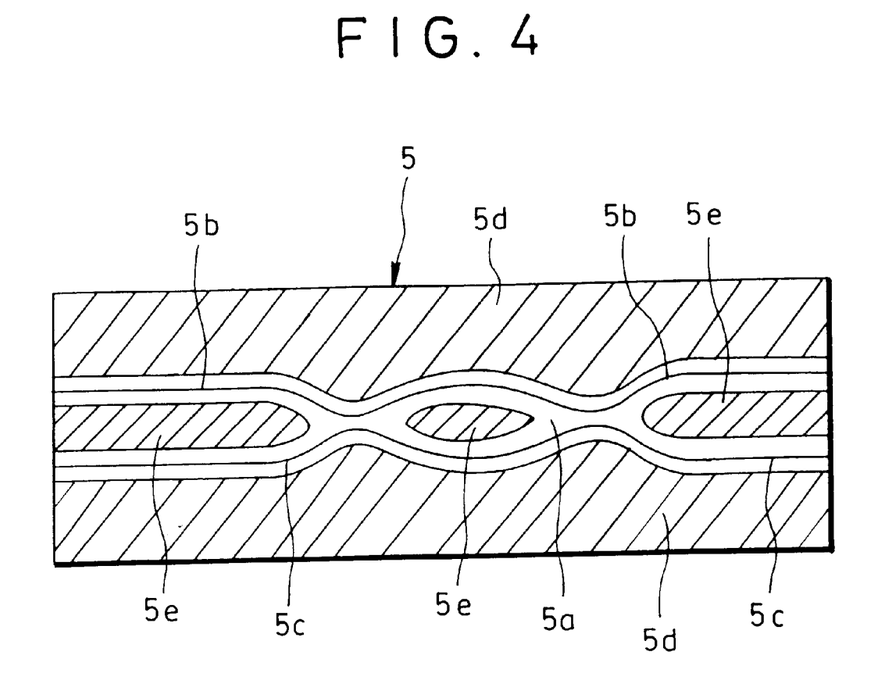
FIG. 4 is a plan view showing a modification of the optical waveguide circuit of FIG. 1.
Figure 5:
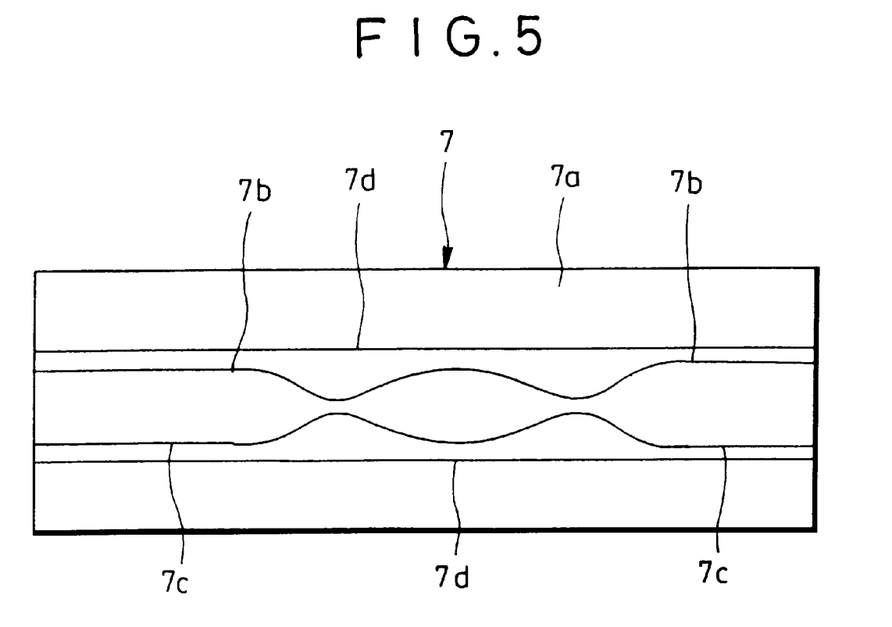
FIG. 5 is a plan view showing another modification of the optical waveguide circuit of FIG. 1.

As in the case of an optical waveguide circuit 5 shown in FIG. 4, light confinement portions 5d and 5e that are not coupled directly to waveguide cores 5b and 5c on a substrate 5a may be arranged in the whole hatched region that extends along the opposite sides of the waveguide cores 5b and 5c. As in the case of an optical waveguide circuit 7 shown in FIG. 5, moreover, a light confinement portion 7d may be located along each side of each of waveguide cores 7b and 7c on a substrate 7a so as to cover the overall length of the substrate 7a. In the optical waveguide circuits 5 and 7 constructed in this manner, clad-mode light can be restrained from leaking into other ports.

Figure 6:
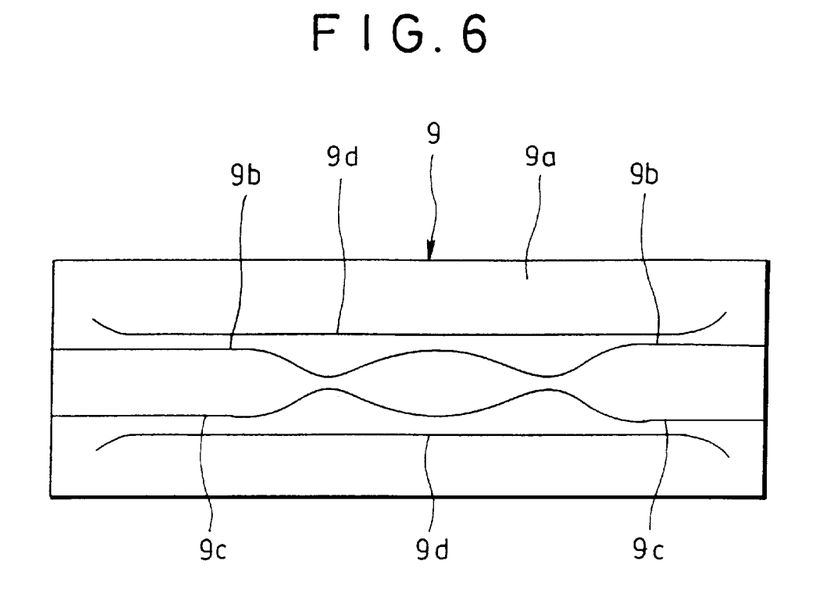
FIG. 6 is a plan view showing still another modification of the optical waveguide circuit of FIG. 1.

Further, the light confinement portions need not be arranged throughout the length of the waveguide cores only if they can restrain the clad-mode light from leaking into other ports. As in the case of an optical waveguide circuit 9 shown in FIG. 6, for example, a light confinement portion 9d may be located along each side of each of waveguide cores 9b and 9c on a substrate 9a so as to extend close to the opposite ends and away from the cores 9b and 9c near the ends. Thus, it is necessary only that the length of each light confinement portion 9d be settled so that cross talks between the waveguide cores 9b and 9c can be prevented securely.

Figure 8A:
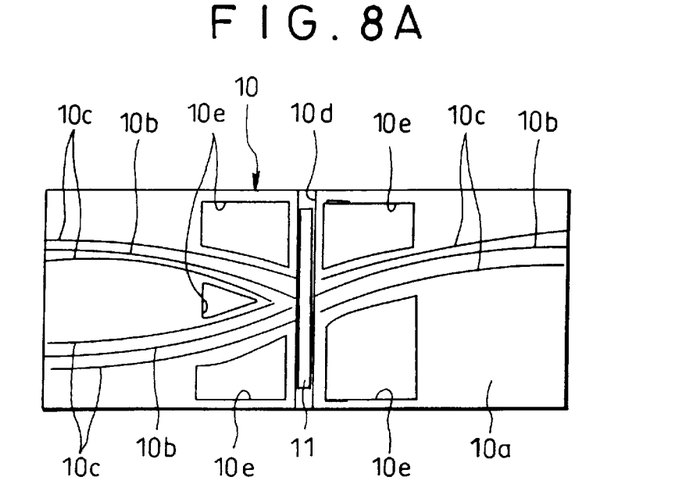
FIGS. 8A and 8B are a plan view and a sectional view, respectively, showing a modification of the optical waveguide circuit of FIG. 7.
Figure 8B:
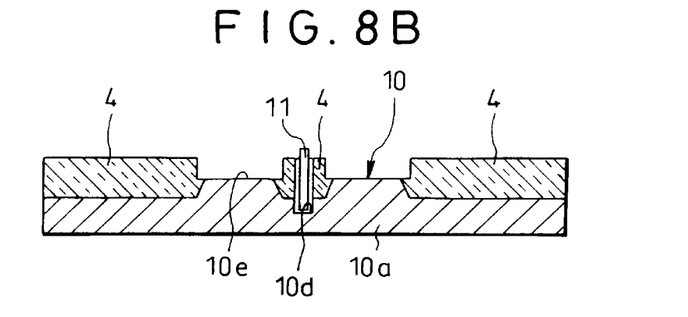
Figure 9:
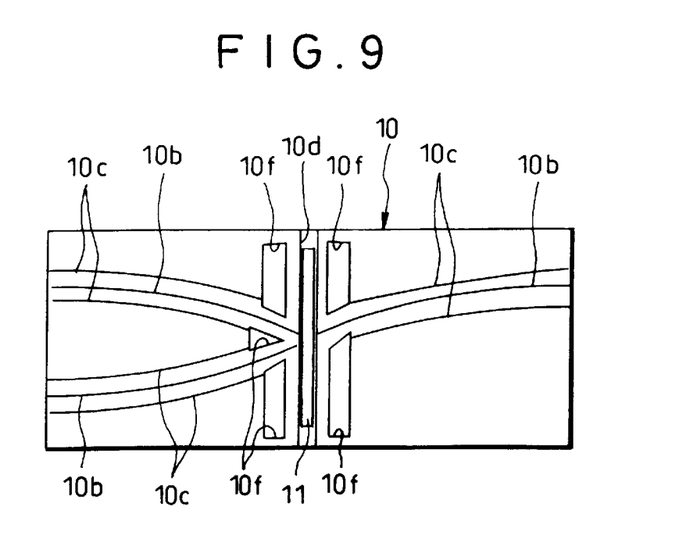
FIG. 9 is a plan view showing another modification of the optical waveguide circuit of FIG. 7.

An optical waveguide circuit according to a second embodiment of the invention and method of fabricating same will now be described with reference to FIGS. 7 to 9.

Figure 7:
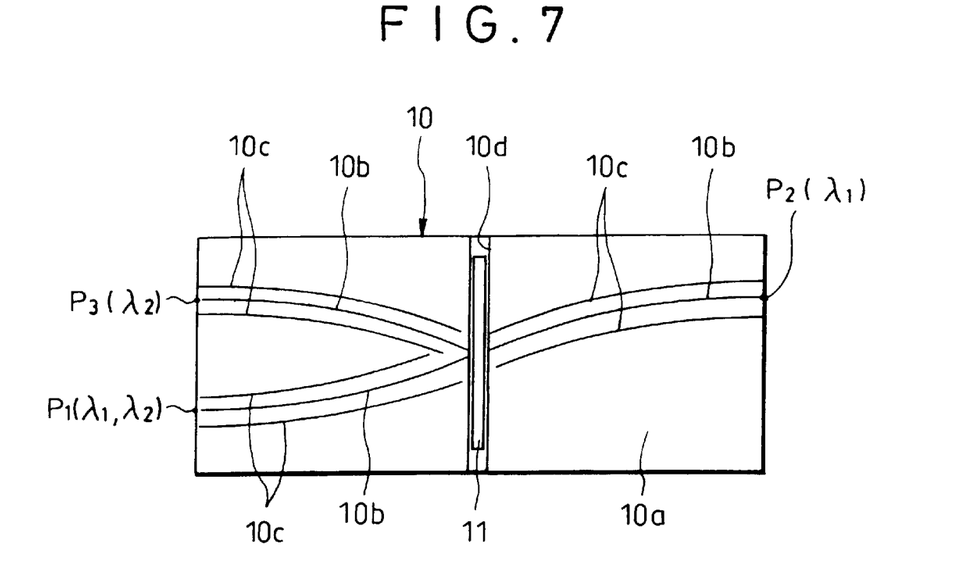
FIG. 7 is a plan view showing a second embodiment of the optical waveguide circuit according to the invention.

As shown in FIG. 7, an optical waveguide circuit 10 comprises Y-shaped waveguide core 10b, including a core and a clad and formed on a substrate 10a that is formed of a compound semiconductor material, such as silicon (Si) or gallium arsenide (GaAs), or some other material such as silica glass, sapphire, etc., and a plurality of light confinement portions 10c, which have substantially the same refractive index as the waveguide core 10b and are arranged along the opposite sides of the core 10b. Further, the optical waveguide circuit 10 is formed with a groove 10d that extends in the crosswise direction of the substrate 10a at the branching portion of the core 10b. A dielectric multi-layer filter 11 is located in the groove 10d. In the optical waveguide circuit 10, the waveguide core 10b and the light confinement portions 10c are arranged at intervals of about 30 to 70 μm lest there be direct optical coupling between them.

The filter 11 is a conventional optical filter that transmits a light beam with the desired wavelength λ1 and reflects a light beam with the desired wavelength λ2.

The optical waveguide circuit 10 constructed in this manner, like the optical waveguide circuit 1 according to the foregoing embodiment, was manufactured by simultaneously forming the waveguide core 10b and the light confinement portions 10c by the RIE method.

In the optical waveguide circuit 10 constructed in this manner, a port P1 of the waveguide core 10b serves as a common port for the incidence and emission of the light beams with the wavelengths λ1 and λ2, a port P2 as a port for the incidence and emission of the light beam with the wavelength λ1, and a port P3 as a port for the incidence and emission of the light beam with the wavelength λ2.

In the optical waveguide circuit 10, therefore, the light beam with the wavelength λ1 projected through the port P2 onto the waveguide core 10b is guided to the port P1 through the filter 11. In the optical waveguide circuit 10, in this case, clad-mode light is generated at the branching portion or the port P2 of the waveguide core 10b. The light beam with the wavelength λ1 is propagated to the port P3 for the incidence and emission of the light beam with the wavelength λ2, in particular, whereby the isolation characteristic is lowered.

On the other hand, the light beam with the wavelength λ1, out of the light beams with the wavelengths λ1 and λ2 projected through the port P1 onto the waveguide core 10b, is transmitted through the filter 11 to the port P2, while the light beam with the wavelength λ2 is reflected and guided to the port P3. In the optical waveguide circuit 10, in this case, clad-mode light is generated in like manner at the port P1 of the waveguide core 10b and the branching portion corresponding to the filter 11. Further, the light beams are scattered or reflected (e.g., the light beam with the wavelength λ1 is partially reflected without being entirely transmitted through the filter 11) at the branching portion or the filter portion and propagated to the port P3, thereby lowering the isolation characteristic.

In the optical waveguide circuit 10, however, a plurality of light confinement portions 10c are arranged along the opposite sides of the waveguide core 10b. In the optical waveguide circuit 10, therefore, the clad-mode light is confined to the light confinement portions 10c, so that it can be restrained from leaking into other ports, thus ensuring a high isolation characteristic.

In the optical waveguide circuit 10, regions to be mounted with optical devices, such as a semiconductor laser (LD), photodiode (PD), etc., may be formed on the substrate 10a by etching. In this case, electrodes and solder patterns are formed for the optical devices. As shown in FIGS. 8A and 8B, the optical waveguide circuit 10 may alternatively be designed so that shading grooves 10e are formed in- and outside a plurality of light confinement portions 10c on the substrate 10a by etching. As shown in FIG. 9, moreover, shading grooves 10f may be formed on those respective end portions of a plurality of light confinement portions 10c which are situated on the side of the groove 10d. In these cases, the substrate 10a is exposed through the shading grooves 10e or 10f. In the optical waveguide circuit 10 constructed in this manner, clad-mode light can be restrained from leaking into other ports, so that a higher isolation characteristic can be obtained.

What is claimed is:

1. An optical waveguide circuit having at least one waveguide core of a desired shape formed on a substrate, wherein at least one light confinement portion having substantially a same refractive index as each side waveguide core is arranged along at least one side of each side waveguide core at an interval from each side waveguide core.

2. An optical waveguide circuit having at least one waveguide core of a desired shape formed on a substrate, wherein at least one light confinement portion having substantially a same refractive index as each said waveguide core is arranged along at least one side of each said waveguide core, and wherein a width of each said light confinement portion ranges from 3 to 20 μm.

3. The optical waveguide circuit according to claim 1, wherein each said waveguide core and each said light confinement portion are arranged at a distance of 30 μm or more from each other.

4. The optical waveguide circuit according to claim 2, wherein each said waveguide core and each said light confinement portion are arranged at a distance of 30 μm or more from each other.

5. An optical waveguide circuit having a waveguide core of a desired shape formed on a substrate, wherein at least one light confinement portion having substantially a same refractive index as said waveguide core is arranged along at least one side of said waveguide core, and wherein said waveguide core has a branching portion at which an optical filter is located across the waveguide core.

6. The optical waveguide circuit according to claim 5, wherein a width of each said light confinement portion ranges from 3 to 20 μm.

7. The optical waveguide circuit according to claim 5, wherein said waveguide core and each said light confinement portion are arranged at a distance of 30 μm or more from each other.

8. The optical waveguide circuit according to claim 6, wherein said waveguide core and each said light confinement portion are arranged at a distance of 30 μm or more from each other.

9. The optical waveguide circuit according to claim 5, wherein said optical filter transmits a light beam with a first wavelength and reflects a light beam with a second wavelength.

10. The optical waveguide circuit according to claim 6, wherein said optical filter transmits a light beam with a first wavelength and reflects a light beam with a second wavelength.

11. The optical waveguide circuit according to claim 7, wherein said optical filter transmits a light beam with a first wavelength and reflects a light beam with a second wavelength.

12. The optical waveguide circuit according to claim 8, wherein said optical filter transmits a light beam with a first wavelength and reflects a light beam with a second wavelength.

13. A method of manufacturing an optical waveguide circuit having at least one waveguide core of a desired shape on a substrate and at least one light confinement portion having substantially a same refractive index as each said waveguide core arranged along at least one side of each said waveguide core, said method comprising simultaneously forming each said waveguide core and each said light confinement portion.

* * * * *